US009049230B2

(12) United States Patent
Liu et al.

(10) Patent No.: US 9,049,230 B2
(45) Date of Patent: Jun. 2, 2015

(54) BACKUP METHOD AND BACKUP DEVICE FOR TCP CONNECTION

(71) Applicant: Huawei Technologies Co., Ltd., Shenzhen (CN)

(72) Inventors: Yuanzhang Liu, Beijing (CN); Yinghui Guo, Beijing (CN); Yongle Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 13/935,751

(22) Filed: Jul. 5, 2013

(65) Prior Publication Data

US 2013/0297808 A1 Nov. 7, 2013

Related U.S. Application Data

(63) Continuation of application No. PCT/CN2011/078508, filed on Aug. 17, 2011.

(30) Foreign Application Priority Data

Jan. 6, 2011 (CN) .......................... 2011 1 0002162

(51) Int. Cl.
*G06F 15/16* (2006.01)
*H04L 29/06* (2006.01)
(Continued)

(52) U.S. Cl.
CPC .............. *H04L 69/16* (2013.01); *H04L 69/162* (2013.01); *H04L 41/0663* (2013.01); *H04L 69/40* (2013.01); *H04L 67/16* (2013.01)

(58) Field of Classification Search
CPC ..... H04L 29/06; H04L 69/16; H04L 41/0663; H04L 69/162; H04L 69/40; H04L 67/16

USPC .......................... 709/227–228, 230, 238–239
See application file for complete search history.

(56) References Cited

U.S. PATENT DOCUMENTS

| 7,085,960 B2 | 8/2006 | Bouat et al. |
| 2004/0268175 A1 | 12/2004 | Koch et al. |
| 2006/0062142 A1 | 3/2006 | Appanna et al. |
| 2006/0262716 A1 | 11/2006 | Ramaiah et al. |

(Continued)

FOREIGN PATENT DOCUMENTS

| CN | 101132347 A | 2/2008 |
| CN | 101316271 A | 12/2008 |

(Continued)

OTHER PUBLICATIONS

"Transmission Control Protocol" RFC: 793, DARPA Internet Program, Protocol Specification, Sep. 1981, 92 pages.

(Continued)

*Primary Examiner* — Wing F Chan
*Assistant Examiner* — Benjamin M Thieu
(74) *Attorney, Agent, or Firm* — Slater & Matsil, L.L.P.

(57) ABSTRACT

The present invention discloses a backup method and backup device. The backup method for the TCP connection provided by embodiments of the present invention includes: processing a first input packet, and generating, according to a processing result of the first input packet, a new transmission control protocol status and a new socket status; backing up the generated transmission control protocol status and the generated socket status to a transmission control module of the standby board; sending a second input packet to an application module; receiving a first output packet; processing the first output packet, and generating, according to a processing result of first output packet, a new transmission control protocol status and a new socket status; and backing up the transmission control protocol status and the socket status. The present invention further discloses a backup device for a TCP connection.

10 Claims, 7 Drawing Sheets

(51) Int. Cl.
*H04L 12/24* (2006.01)
*H04L 29/14* (2006.01)
*H04L 29/08* (2006.01)

(56) References Cited

U.S. PATENT DOCUMENTS

| | | | |
|---|---|---|---|
| 2008/0159325 A1* | 7/2008 | Chen et al. | 370/432 |
| 2008/0163248 A1* | 7/2008 | Chen | 719/313 |
| 2008/0294784 A1* | 11/2008 | Wang | 709/228 |
| 2008/0320188 A1 | 12/2008 | Luo et al. | |
| 2009/0219931 A1* | 9/2009 | Tu et al. | 370/389 |
| 2011/0153834 A1* | 6/2011 | Bharrat | 709/227 |

FOREIGN PATENT DOCUMENTS

| | | |
|---|---|---|
| CN | 101577731 A | 11/2009 |
| CN | 101651706 A | 2/2010 |
| CN | 101764738 A | 6/2010 |
| CN | 102035687 A | 4/2011 |
| EP | 1 261 186 A1 | 11/2002 |

OTHER PUBLICATIONS

International Search Report received in Application No. PCT/CN2011/078508 mailed Nov. 10, 2011, 6 pages.

* cited by examiner

BACKUP METHOD AND BACKUP DEVICE FOR TCP CONNECTION

CROSS-REFERENCE TO RELATED APPLICATIONS

This application is a continuation of International Application No. PCT/CN2011/078508, filed on Aug. 17, 2011, which claims priority to Chinese Patent Application No. 201110002162.5, filed on Jan. 6, 2011, both of which are hereby incorporated by reference in their entireties.

TECHNICAL FIELD

The present invention relates to the field of communications, and in particular, to a backup method and backup device for a TCP connection.

BACKGROUND

In an Internet protocol suite (Internet protocol suite), a transmission layer is located above an IP layer and below an application layer, and the existing transmission layer generally adopts the transmission control protocol (TCP, Transmission Control Protocol). The application layer sends a data stream used for inter-network transmission to the transmission layer, and then the TCP divides the data stream into data packages of appropriate lengths and transfers the data packages to the IP layer, and the IP layer transports the data packages through a network to a transmission layer of a receiving end entity. The TCP gives a serial number to each sent byte, so as to guarantee that the packages transported to the receiving end may be received in sequence.

In the foregoing data transmission process, the application layer needs to perform, through the transmission layer, data communication, and the TCP may provide a concurrent service for multiple application program processes in the application layer at the same time. Multiple application program processes may need to transmit data through the same TCP protocol port. To distinguish different application program processes, a current computer operating system provides a network socket (Socket) connection for interaction between the application program processes and the TCP/IP protocol, so as to differentiate network communication and connection of different application program processes.

A real-time hot backup processing technical solution that supports an active and standby TCP connection, which is provided by the prior art, synchronizes data between active and standby devices by adopting a TCP packet backup manner, and may keep an original TCP connection after switchover between the active and the standby devices. The process of the prior art is described as follows:

Packet data on an active board first enters an input packet backup buffer area of the active board before being sent up to a transmission control module (TCP module). After the packet that enters the input packet backup buffer area of the active board is tested to be legal, the packet in the input packet backup buffer area of the active board is sent to an input packet backup buffer area on a standby board. The input packet backup buffer areas of the active board and the standby board both send their respective cached packets up to their respective the TCP modules and application modules for processing.

The application module of the active board delivers a processed packet to an output packet backup buffer area of the active board. After the packet in the output packet backup buffer area of the active board is tested to be legal, the packet in the output packet backup buffer area of the active board is sent to an output packet backup buffer area on the standby board. The output packet backup buffers of the active board and the standby board both deliver their respective cached packets to their respective TCP modules for processing.

The packets are cached by utilizing the input packet backup buffer areas and the output packet backup buffer areas of the active board and the standby board in the process of sending up and delivering, so that statuses of the active board and the standby board are updated synchronously. In particular, when the active board has a fault, the standby board enters a main control status, and at present the standby board utilizes backup data thereof to keep the TCP connection, so as to implement non-stop routing (NSR, Non-Stop-Routing), that is, when a routing device in a local end has a fault and performs an operation of switchover between the active and the standby devices, a network neighbor device connected to the routing device does not sense that the switchover is performed between the active board and the standby board.

In the process of implementing the foregoing real-time hot backup processing technical solution that supports the active and standby TCP connection, the inventors find that the technology thereof has at least the following problems:

In the foregoing technical solution, after receiving the packet data, the active board and the standby board process the packet data on the TCP modules and the application modules respectively, because it may occur that the time is not synchronized when the active board and the standby board process data respectively, the foregoing solution cannot really implement service consistency between the active board and the standby board.

SUMMARY OF THE INVENTION

Embodiments of the present invention provide a high-reliability and real-time redundant backup method and a system thereof that support a TCP connection by adopting a status synchronization form, so as to more precisely guarantee consistency of active and standby services.

In order to achieve the foregoing object, the embodiments of the present invention adopt the following technical solutions:

A backup method for a TCP connection includes processing a first input packet, and generating, according to a processing result of the first input packet, a new transmission control protocol status and a new socket status, backing up, to a transmission control protocol module of a standby board, the transmission control protocol status and the socket status that are generated according to the processing result of the first input packet, sending, to an application module, a second input packet generated by means of processing the first input packet, receiving a first output packet obtained by means of processing the second input packet by the application module, processing the first output packet, and generating, according to a processing result of the first output packet, a new transmission control protocol status and a new socket status, and backing up, to the transmission control protocol module of the standby board, the transmission control protocol status and the socket status that are generated according to the processing result of the first output packet.

A backup device for a TCP connection includes an active board and a standby board. The active board includes a first processing unit, configured to process a first input packet and generate, according to a processing result of the first input packet, a new transmission control protocol status and a new socket status, a first backup unit, configured to back up, to a transmission control protocol module of the standby board, the transmission control protocol status and the socket status that are generated according to the processing result of the first input packet, a first sending unit, configured to send, to an application module, a second input packet generated by means of processing the first input packet, a first receiving unit, configured to receive a first output packet obtained by means of processing the second input packet by the application module, a second processing unit, configured to process the first output packet and generate, according to a processing result of the first output packet, a new transmission control protocol status and a new socket status, and a second backup unit, configured to back up, to the transmission control protocol module of the standby board, the transmission control protocol status and the socket status that are generated according to the processing result of the first output packet.

The present invention uses a real-time hot backup solution that is based on the transmission control protocol status (TCP status) and the socket status, backs up the TCP status and the socket status, and makes the transmission control protocol module (TCP module) of the standby board only receive synchronization of the socket status and the TCP status without receiving and processing packet data implemented by the TCP module of the active board, so as to avoid that the time is not synchronized, which occurred when the active board and the standby aboard process packet data respectively, thereby realizing synchronization of active and standby services in a better way.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The following clearly describes the technical solutions according to the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments of the present invention without creative efforts shall fall within the protection scope of the present invention.

Embodiment 1

Figure 1:
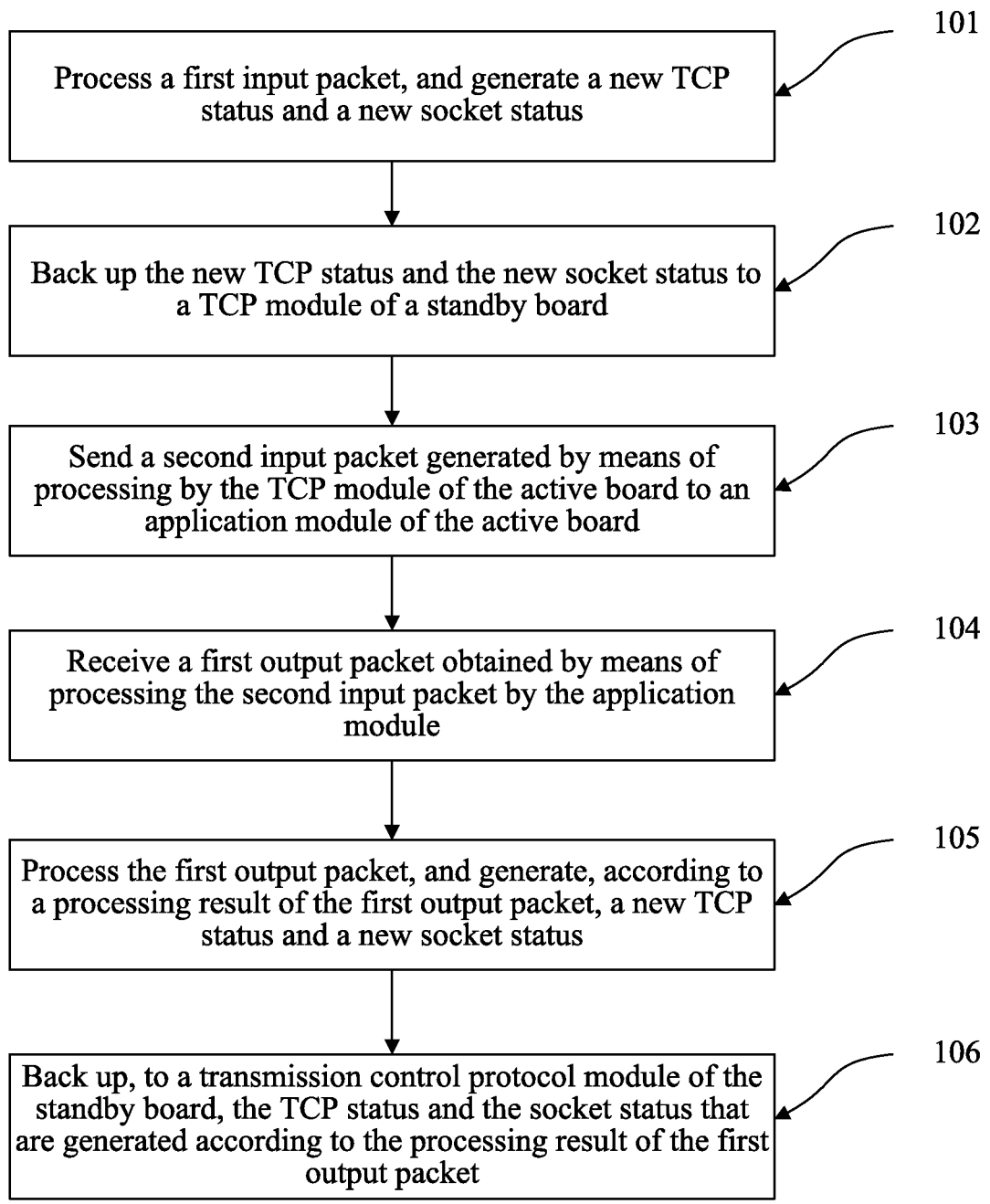
FIG. 1 is a flow chart of a backup method for a TCP connection according to Embodiment 1 of the present invention.
Figure 2:
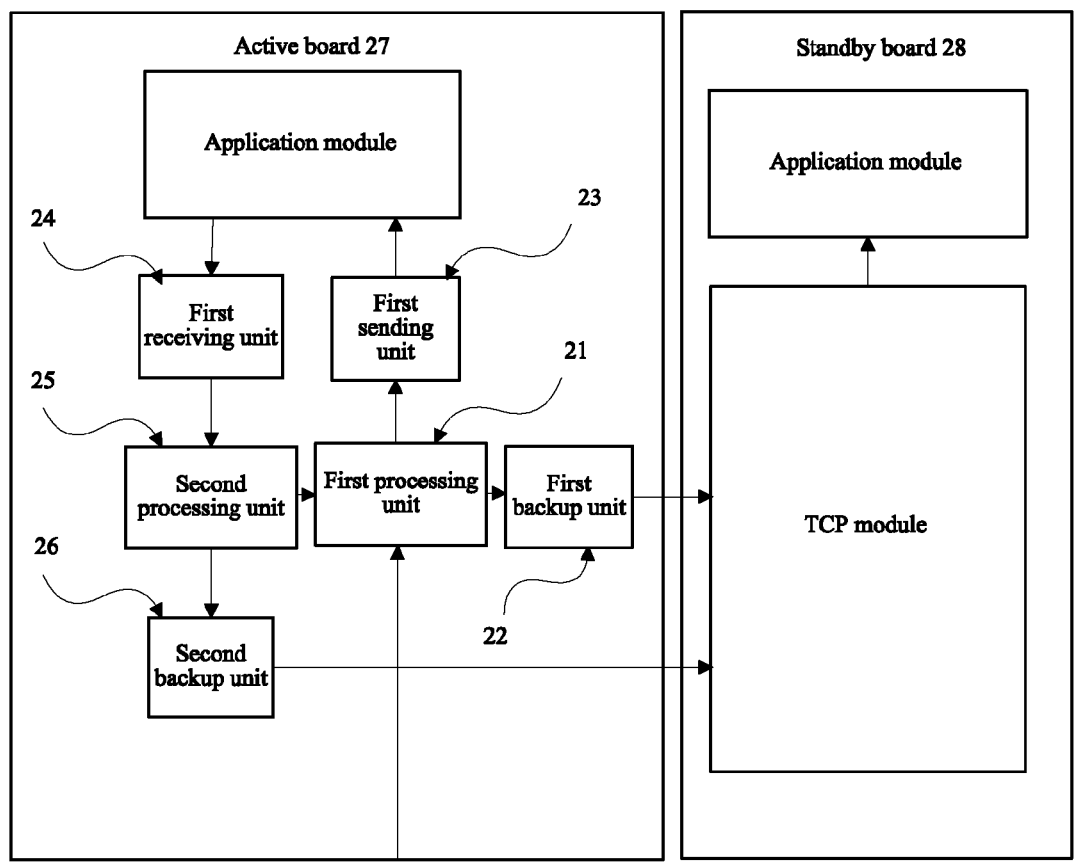
FIG. 2 is a block diagram of a backup device for a TCP connection according to Embodiment 1 of the present invention.

This embodiment discloses a backup method for a TCP connection. As shown in FIG. 1, the method includes the following steps:

101: Upload a first input packet to a TCP module of an active board; and the TCP module of the active board processes the first input packet, and generates, according to a processing result of the first input packet, a new TCP status and a new socket status.

102: Back up, to a TCP module of a standby board, the TCP status and the socket status that are generated according to the processing result of the first input packet.

103: Send, to an application module of the active board, a second input packet generated by means of processing by the TCP module of the active board.

104: The application module of the active board processes the second input packet and generates a first output packet, and the TCP module of the active board receives the first output packet.

105: The TCP module of the active board processes the first output packet and generates, according to a processing result of the first output packet, a new TCP status and a new socket status.

106: Back up, to the TCP module of the standby board, the TCP status and the socket status that are generated according to the processing result of the first output packet.

The embodiment of the present invention further provides a backup device for a TCP connection. The backup device includes an active board 27 and a standby board 28, where the active board 27 includes a first processing unit 21, a first backup unit 22, a first sending unit 23, a first receiving unit 24, a second processing unit 25, and a second backup unit 26.

When an uploaded first input packet enters a TCP module of the active board 27, the first processing unit 21 processes the first input packet, and generates, according to a processing result of the first input packet, a new TCP status and a new socket status; the first backup unit 22 backs up, to a TCP module of the standby board 28, the TCP status and the socket status that are generated according to the processing result of the first input packet; the first sending unit 23 sends, to an application module of the active board 27, a second input packet obtained by means of processing by the first processing unit 21; in addition, the first receiving unit 24 receives a first output packet obtained by means of processing the second input packet by the application module of the active board 27; the second processing unit 25 processes the first output packet, and generates, according to a processing result of the first output packet, a new TCP status and a new socket status; and then the second backup unit 26 backs up, to the TCP module of the standby board 28, the TCP status and the socket status that are generated according to the processing result of the first output packet.

In the backup method and the backup device for the TCP connection disclosed in this embodiment, the TCP module of the active board and the TCP module of the standby board support parallel processing of a packet stream. When processing an input packet, the TCP module can also process an output packet obtained by means of processing another input packet by an application module at the same time.

The foregoing backup method and backup device for the TCP connection provided by this embodiment make the TCP module of the standby board only synchronize a socket status and a TCP status of a packet without receiving and processing packet data implemented by the TCP module of the active board, so as to avoid that the time is not synchronized, which occurred when the active board and the standby board process packet data respectively, realize synchronous backup of the TCP status and the socket status, and realize synchronous consistency of active and standby services in a better way.

Embodiment 2

Figure 3:
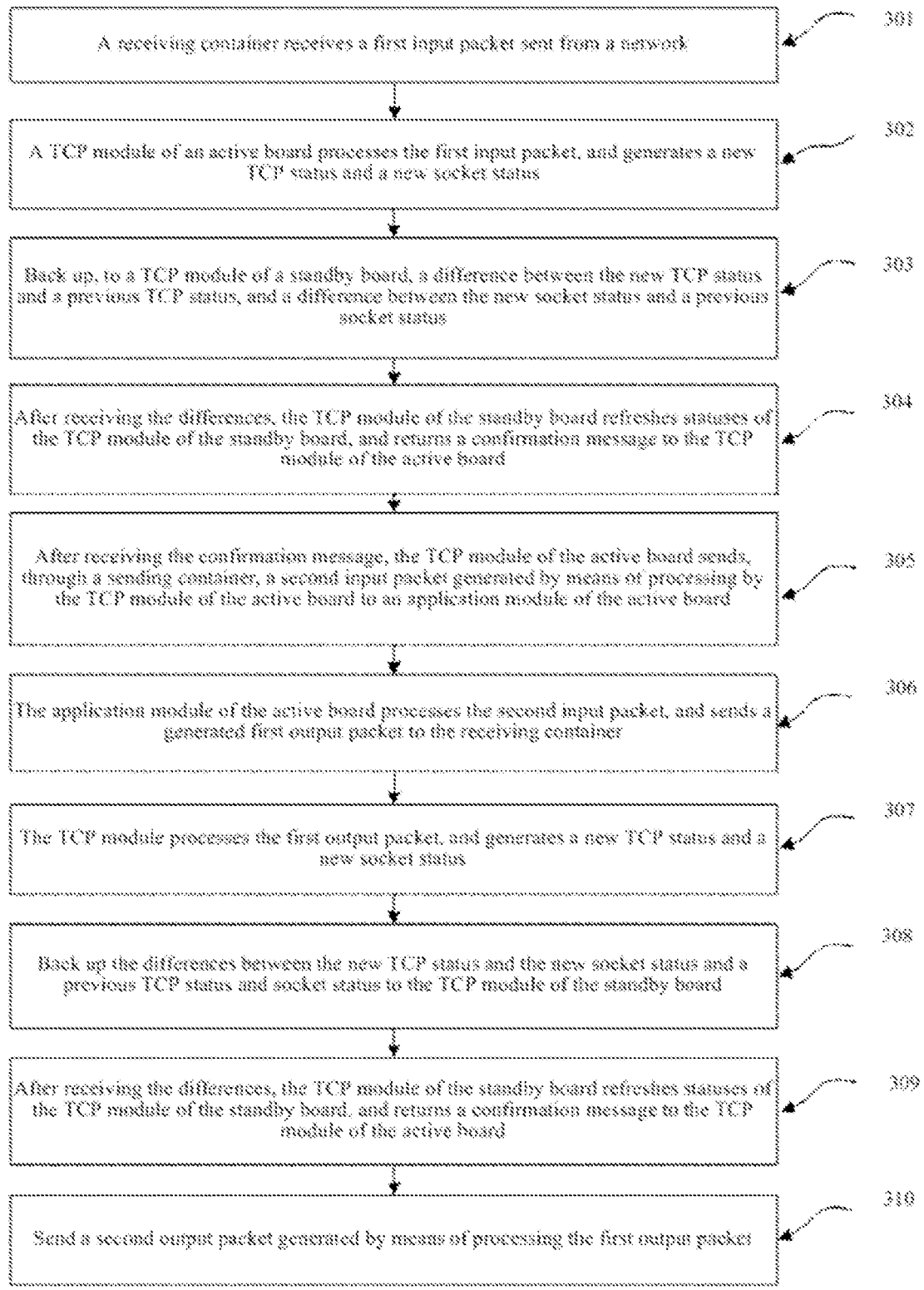
FIG. 3 is a flow chart of a backup method for a TCP connection according to Embodiment 2 of the present invention.

This embodiment discloses a backup method for a TCP connection. As shown in FIG. 3, the method includes the following steps:

301: A receiving container receives a first input packet sent from a network and stores the first input packet into the receiving container.

302: A TCP module of an active board acquires the first input packet from the receiving container and processes the first input packet, and generates, according to a processing result of a first input packet, a new socket status and a new TCP status.

303: Send, to a TCP module of a standby board, a difference between the new TCP status generated by processing the first input packet and a previous TCP status, and a difference between the new socket status generated by processing the first input packet and a previous socket status; and then the active board waits for the standby board to return a confirmation message.

304: After receiving the differences, the TCP module of the standby board updates a socket status and a TCP status on the standby board to the statuses that are generated according to the processing result of the first input packet on the active board, and returns the confirmation message to the TCP module of the active board.

The foregoing 303 to 304 only transmit the difference between the new socket status and the previous socket status, and the difference between the new TCP status and the previous TCP status and accomplish the process of backing up the socket status and the TCP status to the TCP module of the standby board, which may decrease the volume of transmitted data and improve backup efficiency between the active board and the standby board.

When a new socket status is generated on the active board, some new uplink data is also engendered, and when the socket status is backed up to the TCP module of the standby board, the new uplink data is cached in the socket status; therefore, in this embodiment, a sending container of the standby board needs to be opened, so that the standby board may send the uplink data cached in the socket status to an application module of the standby board. After the process of sending the uplink data cached in the socket status is performed, it may be guaranteed that data in the application module of the standby board can also be synchronized with that in an application module of the active board.

305: After receiving the confirmation message in the step 304, the TCP module of the active board caches a second input packet generated by means of processing by the TCP module of the active board in the sending container, and the sending container sends the second input packet to the application module of the active board.

306: The application module of the active board receives and processes the second input packet sent by the TCP module of the active board, and delivers a first output packet generated by means of processing the second input packet to a receiving container of the active board to cache the processed first output packet.

307: The TCP module of the active board acquires the first output packet from the receiving container and processes the first output packet, and generates, according to a processing result of the first output packet, a new socket status and a new TCP status.

308: Send a difference between the new TCP status generated by processing the first output packet and a previous TCP status, and a difference between the new socket status generated by processing the first output packet and a previous socket status to the TCP module of the standby board; and then the active board waits for the standby board to return a confirmation message.

309: After receiving the differences, the TCP module of the standby board updates a socket status and a TCP status on the standby board to the new statuses that are generated according to the processing result of the first output packet on the active board, and returns the confirmation message to the TCP module of the active board.

The foregoing process of 308 to 309 only transmits the difference between the new socket status and the previous socket status, and the difference between the new TCP status and the previous TCP status, and implements backing up of the new socket status and TCP status to the TCP module of the standby board, which may decrease the volume of transmitted data and improve backup efficiency between the active board and the standby board.

310: After receiving the confirmation message in the step 309, the TCP module of the active board sends a second output packet generated by means of processing the first output packet.

In this process, the manner of sending the second output packet may adopt but is not limited to the following solution: caching, in a sending container, the second output packet generated by means of processing by the TCP module of the active board and delivering the second output packet by the sending container.

In the backup method for the TCP connection disclosed in this embodiment, the TCP module of the active board and the TCP module of the standby board support parallel processing of a packet stream. When processing an input packet, the TCP module can also process an output packet obtained by means of processing another input packet by an application module at the same time.

In the backup method for the TCP connection disclosed in this embodiment, the sending container caches the second input packet generated by means of processing by the TCP module of the active board and sends the second input packet to the application module of the active board; and the sending container further caches the second output packet generated by means of processing by the TCP module of the active board and delivers the second output packet. The receiving container caches the first output packet generated by means of processing the second input packet by the application module of the active board, and sends the first output packet to the TCP module of the active board; and the receiving container further caches the first input packet sent up from the network and sends the first input packet to the TCP module of the active board.

Figure 4:
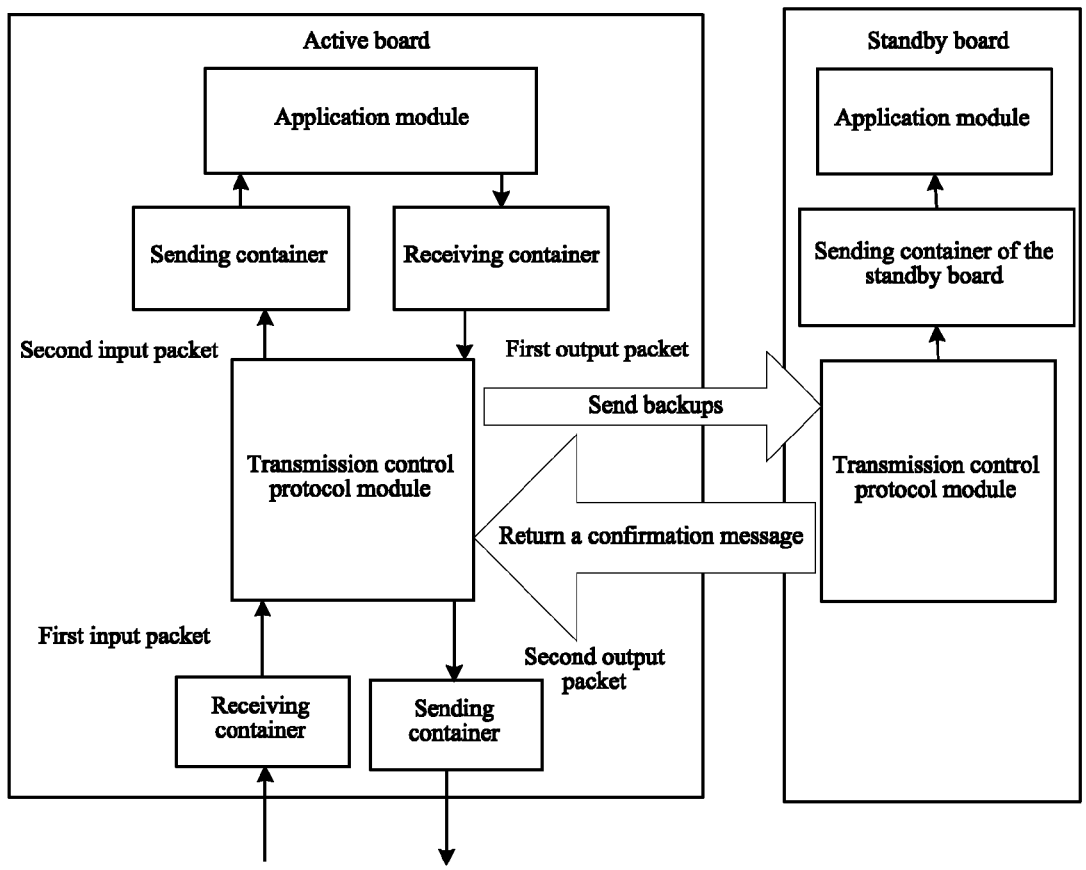
FIG. 4 is a schematic diagram of a backup method for a TCP connection according to Embodiment 2 of the present invention.

The backup method for the TCP connection provided by the embodiment uses a real-time hot backup solution, as shown in FIG. 4, which is based on the TCP status and the socket status and makes the TCP module of the standby board only receive synchronous backups of the socket status and the TCP status without receiving and processing packet data implemented by the TCP module of the active board, so as to avoid that the time is not synchronized, which occurred when the active board and the standby board process packet data respectively, and realize consistency of active and standby services in a better way. The standby board does not perform processing to each packet individually, and when the standby board is in a standby status, the interior of the standby board only performs synchronous backup without other works, which obviously decreases workload of the standby board and improves system performance.

Figure 5:
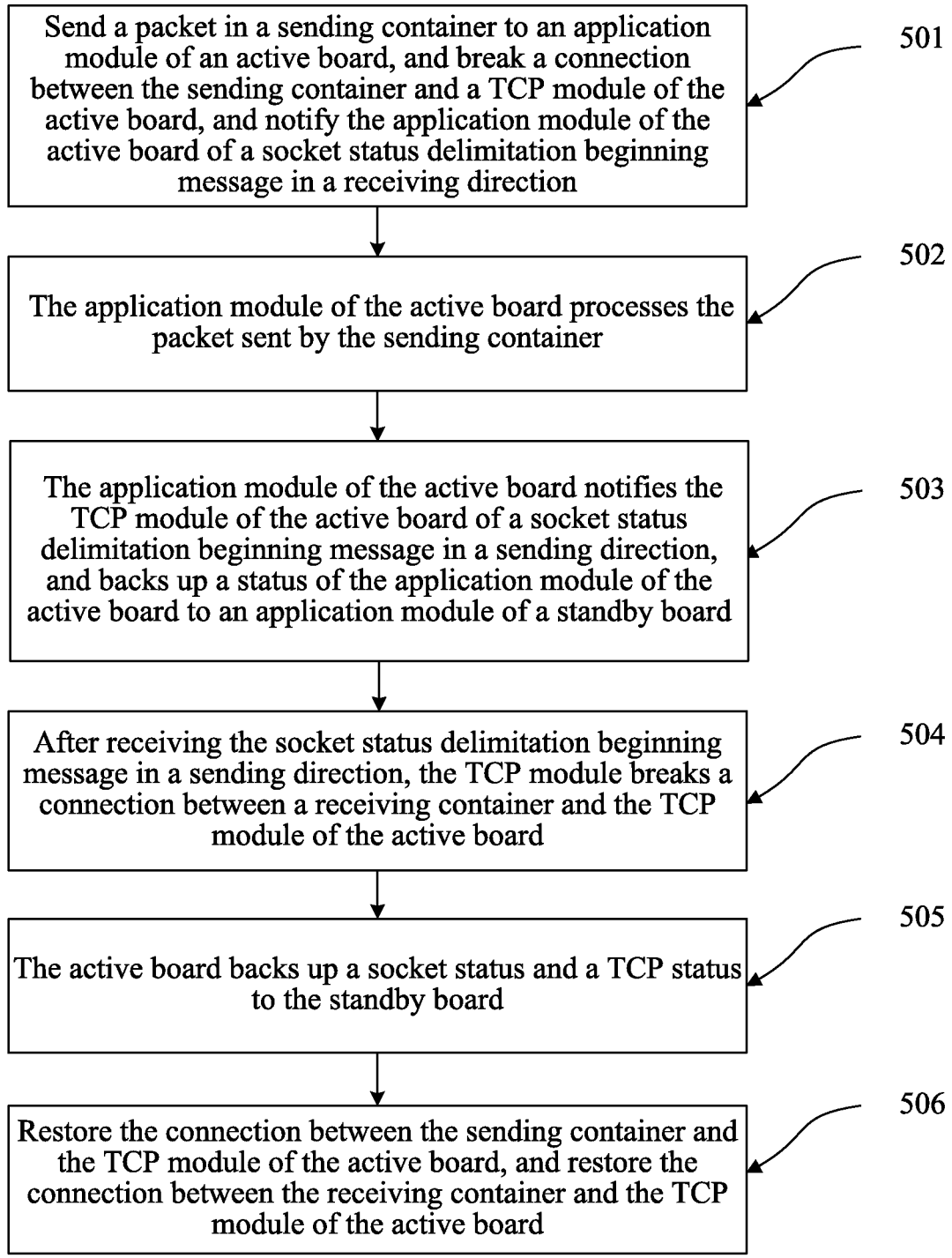
FIG. 5 is a flow chart of performing delimitation synchronization to an initial status of a standby board according to Embodiment 2 of the present invention.

For the backup method for the TCP connection provided in FIG. 3, if the standby board is not included in the system with the active board at the same time, and the standby board is inserted after the active board has run for a while, before the backup method shown in FIG. 3 is performed, delimitation synchronization needs to be performed to an initial status of the standby board according to a current status of the active board. As shown in FIG. 5, the step includes:

501: Send a packet in the sending container to the application module of the active board and break a connection between the sending container and the TCP module of the active board, and notify the application module of the active board of a delimitation beginning message in a receiving direction.

502: After receiving the delimitation beginning message in the receiving direction, the application module of the active board processes the packet sent by the sending container.

503: After accomplishing processing the packet, the application module of the active board notifies the TCP module of the active board of a socket status delimitation beginning message in a sending direction, and backs up a status of the application module of the active board to the application module of the standby board.

504: After receiving the socket status delimitation beginning message in the sending direction, the TCP module of the active board breaks a connection between the receiving container and the TCP module of the active board.

505: The active board backs up the socket status and the TCP status to the standby board.

506: After accomplishing backing up the socket status and the TCP status, the TCP module of the standby board returns a confirmation message to the TCP module of the active board, and then the active board restores the connection between the sending container and the TCP module and restores the connection between the receiving container and the TCP module, and the active board and the standby board begin to perform real-time backups of active and standby services.

Figure 6:
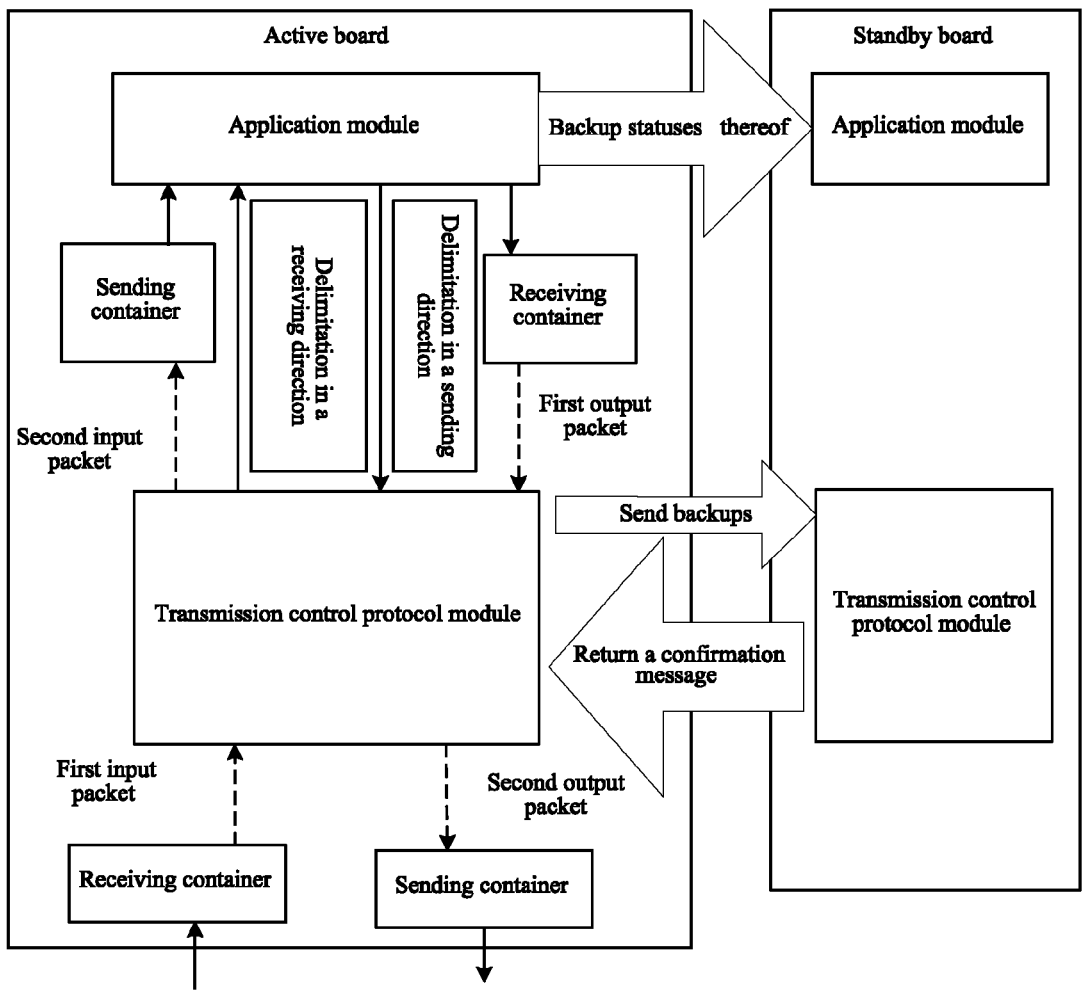
FIG. 6 is a schematic diagram of performing delimitation synchronization to an initial status of a standby board according to Embodiment 2 of the present invention.

In correspondence to the steps of performing the delimitation synchronization to the initial status of the standby board, this embodiment further provides a device, as shown in FIG. 6, so as to implement the foregoing steps.

When the standby board is inserted in the system, the method shown in FIG. 5 guarantees, by controlling connection statuses of the sending container and the receiving container, that the socket status and the TCP status of the active board are stable, so that the standby board can perform backup and thus delimitation processing is much simple when the standby board loads a system.

Embodiment 3

Figure 7:
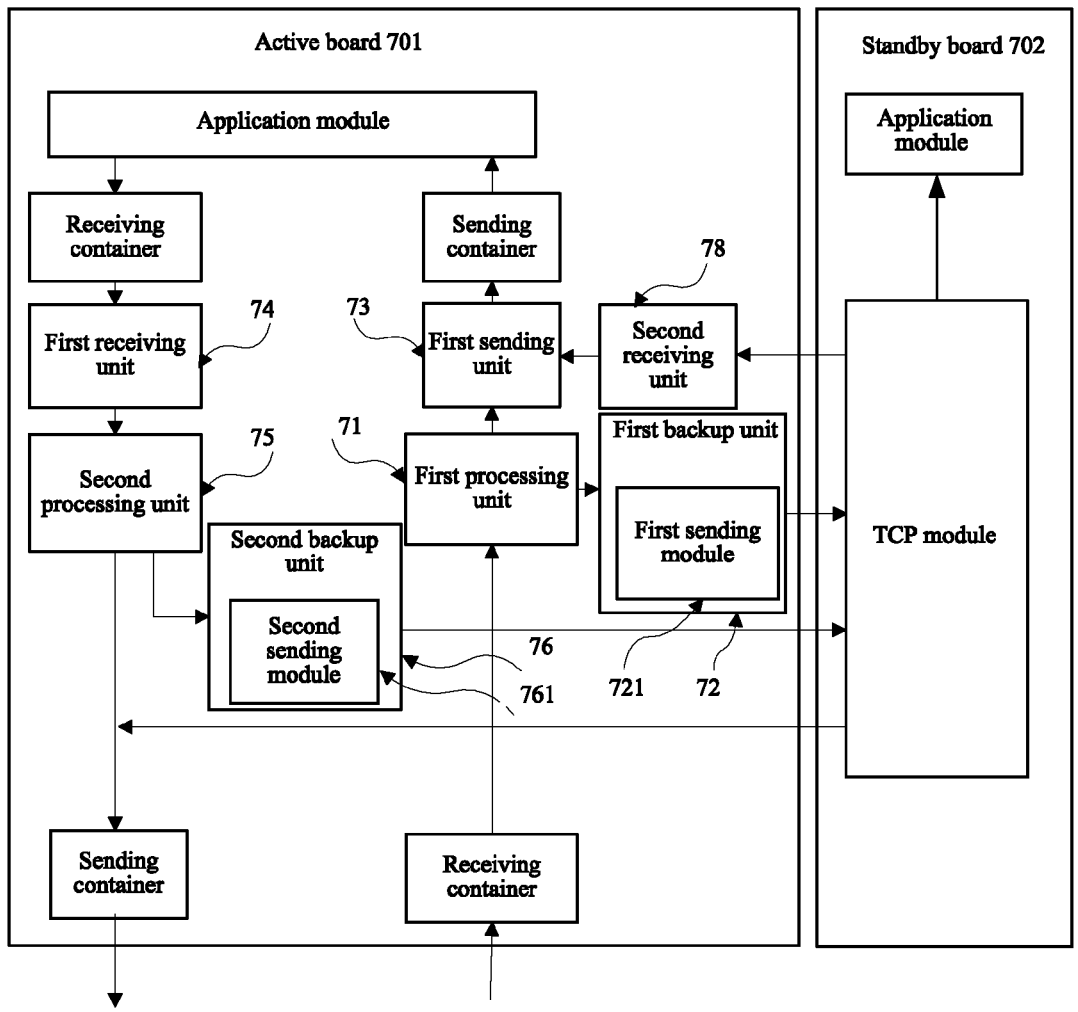
FIG. 7 is a block diagram of a backup device for a TCP connection according to Embodiment 3 of the present invention.

This embodiment discloses a backup device for a TCP connection. As shown in FIG. 7, the device includes an active board 701 and a standby board 702, where the active board 701 includes a first processing unit 71, a first backup unit 72, a first sending unit 73, a first receiving unit 74, a second processing unit 75, and a second backup unit 76.

When a first input packet cached in a receiving container is scheduled by a TCP module of the active board 701, the first input packet enters the first processing unit 71; the first processing unit 71 processes the first input packet and generates, according to a processing result of the first input packet, a new TCP status and a new socket status; the first backup unit 72 backs up, to a TCP module of the standby board 702, the TCP status and the socket status that are generated by means of processing by the first processing unit 71 according to the processing result of the first input packet; the first sending unit 73 sends, to an application module of the active board 701, a second input packet generated by means of processing of the first processing unit 71; in addition, the application module of the active board 701 caches, in the receiving container, a first output packet obtained by means of processing the second input packet; when being scheduled by the TCP module of the active board 701, the first output packet cached in the receiving container enters the first receiving unit 74; the first receiving unit 74 receives the first output packet obtained by means of processing the second input packet by the application module of the active board 701; the second processing unit 75 processes the first output packet and generates, according to a processing result of the first output packet, a new TCP status and a new socket status; and then the second backup unit 76 backs up, to a TCP module of the standby board 702, the TCP status and socket status that are generated according to the processing result of the first output packet.

As the improvement of the embodiment of the present invention, on the one hand, in the embodiment of the present invention, the first backup unit 72 includes a first sending module 721 in a specific implementation, where the first sending module 721 is configured to send a difference between the TCP status generated according to the processing result of the first input packet and a previous TCP status, and a difference between the socket status generated according to the processing result of the first input packet and a previous socket status to the TCP module of the standby board 702, and when performing backup, the TCP module of the standby board 702 refreshes, according to the differences, the statuses of the TCP module of the standby board 702 to the TCP status and the socket status that are generated according to the processing result of the first input packet. At the same time, when a new socket status is generated on the active board, some new uplink data is also engendered, and when the socket status is backed up to the TCP module of the standby board, the new uplink data is cached in the socket status; therefore, this embodiment further needs to send, to the application module of the standby board 702, the uplink data cached in the socket status of the TCP module of the standby board 702. After the process of sending the uplink data cached in the socket status is performed, it may be guaranteed that data in the application module of the standby board 702 can also be synchronized with that in the application module of the active board 701. On the other hand, in the embodiment of the present invention, the second backup unit 76 includes a second sending module 761 in a specific implementation, where the second sending module 761 is configured to send a difference between the TCP status generated according to a processing result of the first output packet and a previous TCP status, and a difference between the socket status generated according to the processing result of the first output packet and a previous socket status to the TCP module of the standby board 702, and when performing backup, the TCP module of the standby board 702 refreshes, according to the differences, the statuses of the TCP module of the standby board 702 to the TCP status and the socket status that are generated according to the processing result of the first output packet.

As shown in FIG. 7, in the embodiment of the present invention, the active board 701 in the backup device for the TCP connection further includes a second receiving unit 78. The second receiving unit 78 is configured to: after the first backup unit 72 backs up, to the TCP module of the standby board 702, the TCP status and the socket status that are generated according to the processing result of the first input packet, receive a confirmation message returned by the TCP module of the standby board 702 and transfer the confirmation message returned by the TCP module of the standby board 702 to the first sending unit 73; and after receiving the confirmation message transferred by the second receiving unit 78, the first sending unit 73 caches, to a sending container, the second input packet generated by means of processing by the first processing unit 71 and the sending container sends, to the application module of the active board 701, the second input packet generated by means of processing by the first processing unit 71.

In the backup device for the TCP connection disclosed in this embodiment, the TCP module of the active board and the TCP module of the standby board support parallel processing of a packet stream. When processing an input packet, the TCP module can also process an output packet obtained after an application module processes another input packet at the same time.

In the backup method for the TCP connection disclosed in this embodiment, the sending container caches the second input packet generated by means of processing by the TCP module of the active board and sends the second input packet to the application module of the active board; and the sending container further caches the second output packet generated by means of processing by the TCP module of the active board and delivers the second output packet. The receiving container caches the first output packet generated by means of processing the second input packet by the application module of the active board, and sends the first output packet to the TCP module of the active board; and the receiving container further caches the first input packet sent up from the network and sends the first input packet to the TCP module of the active board.

The backup device for the TCP connection provided by the embodiment makes, through real-time backup processing that is based on the TCP status and the socket status, the TCP module of the standby board only receives synchronous backups of the socket status and the TCP status without receiving and processing packet data implemented by the TCP module of the active board, so as to avoid that the time is not synchronized, which occurred when the active board and the standby board processes packet data respectively, and realize consistency of active and standby services in a better way. The standby board does not perform processing to each packet individually, which obviously decreases workload of the standby board when backup work is performed and improves the system performance.

For the backup device for the TCP connection provided by the embodiment, if the standby board does not load a system with the active board at the same time, and the standby board is inserted after the active board has run for a while, before beginning to perform active and standby services, delimitation synchronization needs to be performed, according to a current status of the active board, to an initial status of the standby board as shown in FIG. 6.

A packet in the sending container is sent to the application module of the active board and a connection between the sending container and the TCP module of the active board is broken; and the application module of the active board is notified of a delimitation beginning message in a receiving direction.

After receiving the delimitation beginning message in the receiving direction, the application module of the active board processes the packet sent by the sending container.

After accomplishing processing the packet, the application module of the active board notifies the TCP module of the active board of a socket status delimitation beginning message in a sending direction, and backs up a status of the application module of the active board to the application module of the standby board.

After receiving the socket status delimitation beginning message in the sending direction, the TCP module breaks a connection between the receiving container and the TCP module of the active board.

The active board backs up the socket status and the TCP status to the standby board.

After accomplishing backing up the socket status and the TCP status, the TCP module of the standby board returns a confirmation message to the TCP module of the active board, and then the active board restores the connection between the sending container and the TCP module and restores the connection between the receiving container and the TCP module, and the active board and the standby board begin to perform real-time backups of active and standby services.

When the standby board is inserted in the system, by controlling connection statuses of the sending container and the receiving container, it is guaranteed that the socket status and the TCP status of the active board are stable, so that the standby board can perform backup and thus the delimitation processing is much simple when the standby board loads a system.

The embodiment of the present invention is applied in a backup service of the TCP connection and supports real-time backup processing of active and standby devices.

The foregoing descriptions are merely exemplary embodiments of the present invention, but not intended to limit the protection scope of the present invention. Any variation or replacement made by persons skilled in the art without departing from the spirit of the present invention shall fall within the protection scope of the present invention. Therefore, the scope of the present invention shall be subject to the appended claims.

What is claimed is:

1. A backup method for a transmission control protocol (TCP) connection, comprising:
   processing a first input packet, and generating, according to a processing result of the first input packet, a new transmission control protocol status and a new socket status;
   backing up, to a transmission control protocol module of a standby board, the transmission control protocol status and the socket status that are generated according to the processing result of the first input packet;
   sending, to an application module, a second input packet generated by processing the first input packet;
   receiving a first output packet obtained by processing the second input packet by the application module;
   processing the first output packet, and generating, according to a processing result of the first output packet, a new transmission control protocol status and a new socket status; and
   backing up, to the transmission control protocol module of the standby board, the transmission control protocol status and the socket status that are generated according to the processing result of the first output packet;
   wherein a sending container of an active board caches the second input packet obtained by processing the first input packet by the transmission control protocol module and a second output packet obtained by processing the first output packet by the transmission control protocol module; and before the backup method is performed, the method further comprises:

sending, the second input packet obtained by processing the first input packet in the sending container to an application module of the active board, breaking a connection between the sending container and the transmission control protocol module, and notifying the application module of the active board of a socket status delimitation beginning message in a receiving direction;

processing, by the application module of the active board, the second input packet; after accomplishing processing the second input packet, notifying, by the application module of the active board, a transmission control protocol module of the active board of a socket status delimitation beginning message in a sending direction, and backing up a status of the application module of the active board to the application module of the standby board;

after receiving the socket status delimitation beginning message in the sending direction, breaking, by the transmission control protocol module of the active board, a connection between a receiving container and the transmission control protocol module, wherein the receiving container caches the first input packet and the first output packet that is obtained by processing of the application module;

backing up, by the active board, the socket status and the transmission control protocol status to the standby board; and restoring the connection between the sending container and the transmission control protocol module, and restoring the connection between the receiving container and the transmission control protocol module.

2. The backup method for a TCP connection according to claim 1, wherein the backing up, to the transmission control protocol module of the standby board, the transmission control protocol status and the socket status that are generated according to the processing result of the first input packet comprises:

sending, to the transmission control protocol module of the standby board, a difference between the transmission control protocol status generated according to the processing result of the first input packet and a previous transmission control protocol status, and a difference between the socket status generated according to the processing result of the first input packet and a previous socket status; and updating, by the transmission control protocol module of the standby board, a transmission control protocol status and a socket status on the standby board to the statuses that are generated according to the processing result of the first input packet on the active board after receiving the difference.

3. The backup method for a TCP connection according to claim 1, wherein the backing up, to the transmission control protocol module of the standby board, the transmission control protocol status and the socket status that are generated according to the processing result of the first output packet comprises:

sending, to the transmission control protocol module of the standby board, a difference between the transmission control protocol status generated according to the processing result of the first output packet and a previous transmission control protocol status, and a difference between the socket status generated according to the processing result of the first output packet and a previous socket status; and updating, by the transmission control protocol module of the standby board, a transmission control protocol status and a socket status on the standby board to the statuses that are generated according to the processing result of the first output packet on the active board after receiving the difference.

4. The backup method for a TCP connection according to claim 1, after the backing up, to the transmission control protocol module of the standby board, the transmission control protocol status and the socket status that are generated according to the processing result of the first input packet, the method further comprising:

receiving a confirmation message returned by the transmission control protocol module of the standby board, wherein the sending, to the application module, the second input packet generated by processing the first input packet is: after receiving the confirmation message, sending the second input packet generated by processing the first input packet to the application module.

5. The backup method for a TCP connection according to claim 4, further comprising:

after the transmission control protocol module of the standby board returns the confirmation message, sending, by the transmission control protocol module of the standby board, cached uplink data in the socket status that has been backed up, to an application module of the standby board.

6. A backup device for a transmission control protocol (TCP) connection, comprising an active board and a standby board, wherein the active board comprises:

a memory with instructions, coupled to a processor, to cause the processor to execute the following units;

a first processing unit, configured to process a first input packet and generate, according to a processing result of the first input packet, a new transmission control protocol status and a new socket status;

a first backup unit, configured to back up, to a transmission control protocol module of the standby board, the transmission control protocol status and the socket status that are generated according to the processing result of the first input packet;

a first sending unit, configured to send, to an application module, a second input packet generated by processing the first input packet;

a first receiving unit, configured to receive a first output packet obtained by processing the second input packet by the application module;

a second processing unit, configured to process the first output packet and generate, according to a processing result of the first output packet, a new transmission control protocol status and a new socket status; and a second backup unit, configured to back up, to the transmission control protocol module of the standby board, the transmission control protocol status and the socket status that are generated according to the processing result of the first output packet;

wherein a sending container of the active board caches the second input packet obtained by processing the first input packet by the transmission control protocol module and a second output packet obtained by processing the first output packet by the transmission control protocol module, and before the backup process is performed, the process further comprises:

sending, by the active board, the second input packet in the sending container to an application module of the active board, breaking a connection between the sending container and the transmission control protocol module, and notifying the application module of the active board of delimitation beginning in a receiving direction;

processing, by the application module of the active board, the received second input packet;

after accomplishing processing the second input packet, notifying, by the application module of the active board, the transmission control protocol module of a socket status delimitation beginning message in a sending direction, and backing up a status of the application module of the active board to the application module of the standby board;

after receiving the socket status delimitation beginning message in the sending direction, breaking, by the transmission control protocol module of the active board, a connection between a receiving container and the transmission control protocol module, wherein the receiving container caches the first input packet and the first output packet that is obtained by processing the second input packet by the application module;

backing up, by the active board, the socket status and the transmission control protocol status to the standby board; and restoring the connection between the sending container and the transmission control protocol module, and restoring the connection between the receiving container and the transmission control protocol module.

7. The backup device for a TCP connection according to claim 6, wherein the first backup unit comprises:

a first sending module, configured to send, to the transmission control protocol module of the standby board, a difference between the transmission control protocol status generated according to the processing result of the first input packet and a previous transmission control protocol status, and a difference between the socket status generated according to the processing result of the first input packet and a previous socket status, wherein the transmission control protocol module of the standby board configured to update a transmission control protocol status and a socket status on the standby board to the statuses that are generated according to the processing result of the first input packet on the active board after receiving the difference.

8. The backup device for a TCP connection according to claim 6, wherein the second backup unit comprises:

a second sending module, configured to send, to the transmission control protocol module of the standby board, a difference between the transmission control protocol status generated according to the processing result of the first output packet and a previous transmission control protocol status, and a difference between the socket status generated according to the processing result of the first output packet and a previous socket status, wherein the transmission control protocol module of the standby board configured to update a transmission control protocol status and a socket status on the standby board to the statuses that are generated according to the processing result of the first output packet on the active board after receiving the difference.

9. The backup device for a TCP connection according to claim 6, wherein the active board further comprises:

a second receiving unit, configured to receive a confirmation message returned by the transmission control protocol module of the standby board after the transmission control protocol status and the socket status that are generated according to the processing result of the first input packet are backed up to the transmission control protocol module of the standby board, wherein the first sending unit is configured to send the second input packet to the application module after the confirmation message is received.

10. The backup device for a TCP connection according to claim 9, wherein after the transmission control protocol module of the standby board returns the confirmation message, the transmission control protocol module of the standby board sends, to an application module of the standby board, cached uplink data in the socket status that has been backed up.

* * * * *